Patented Jan. 1, 1924.

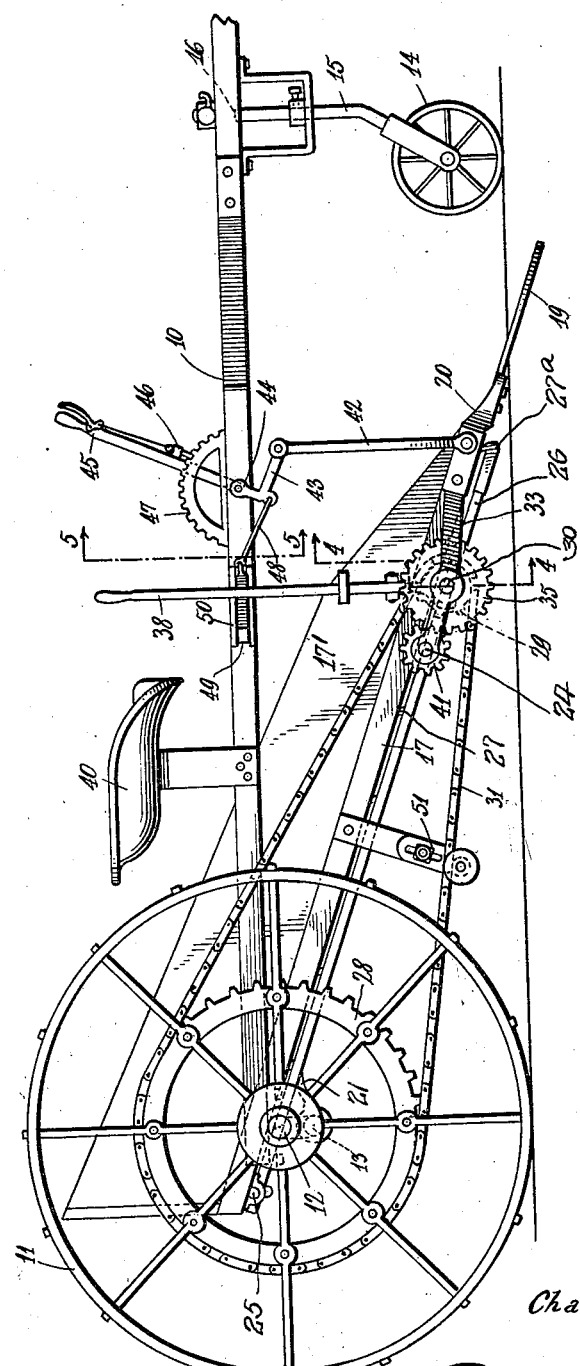

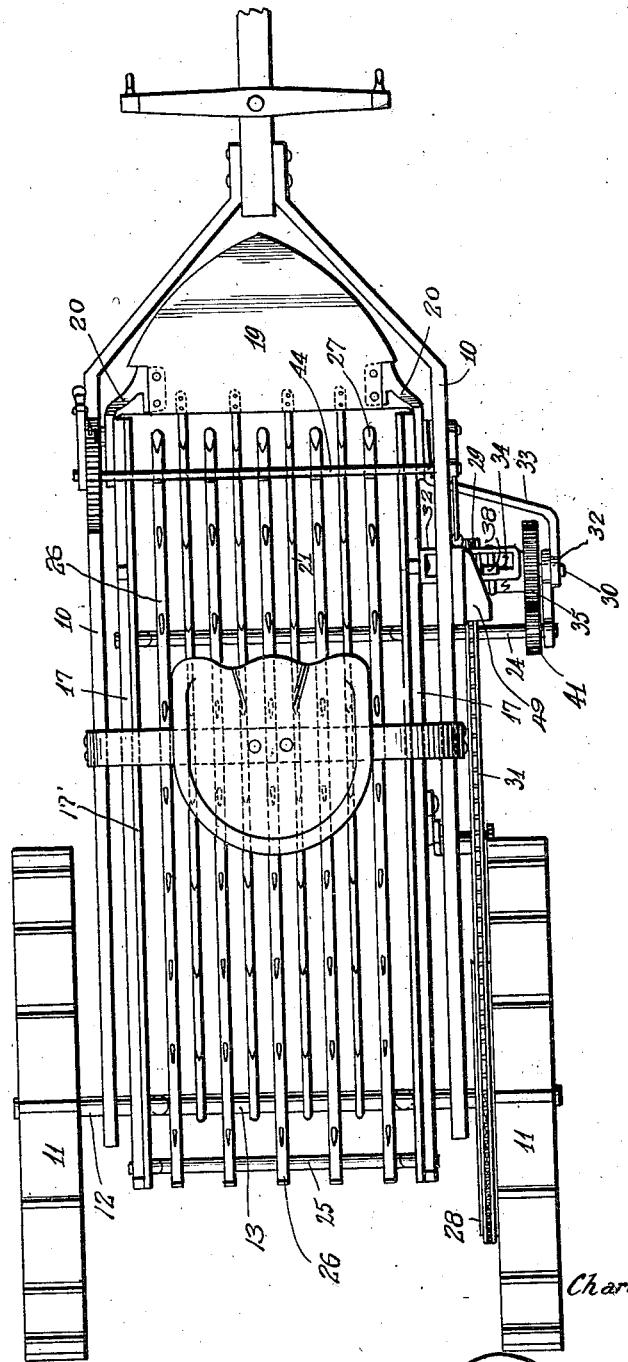

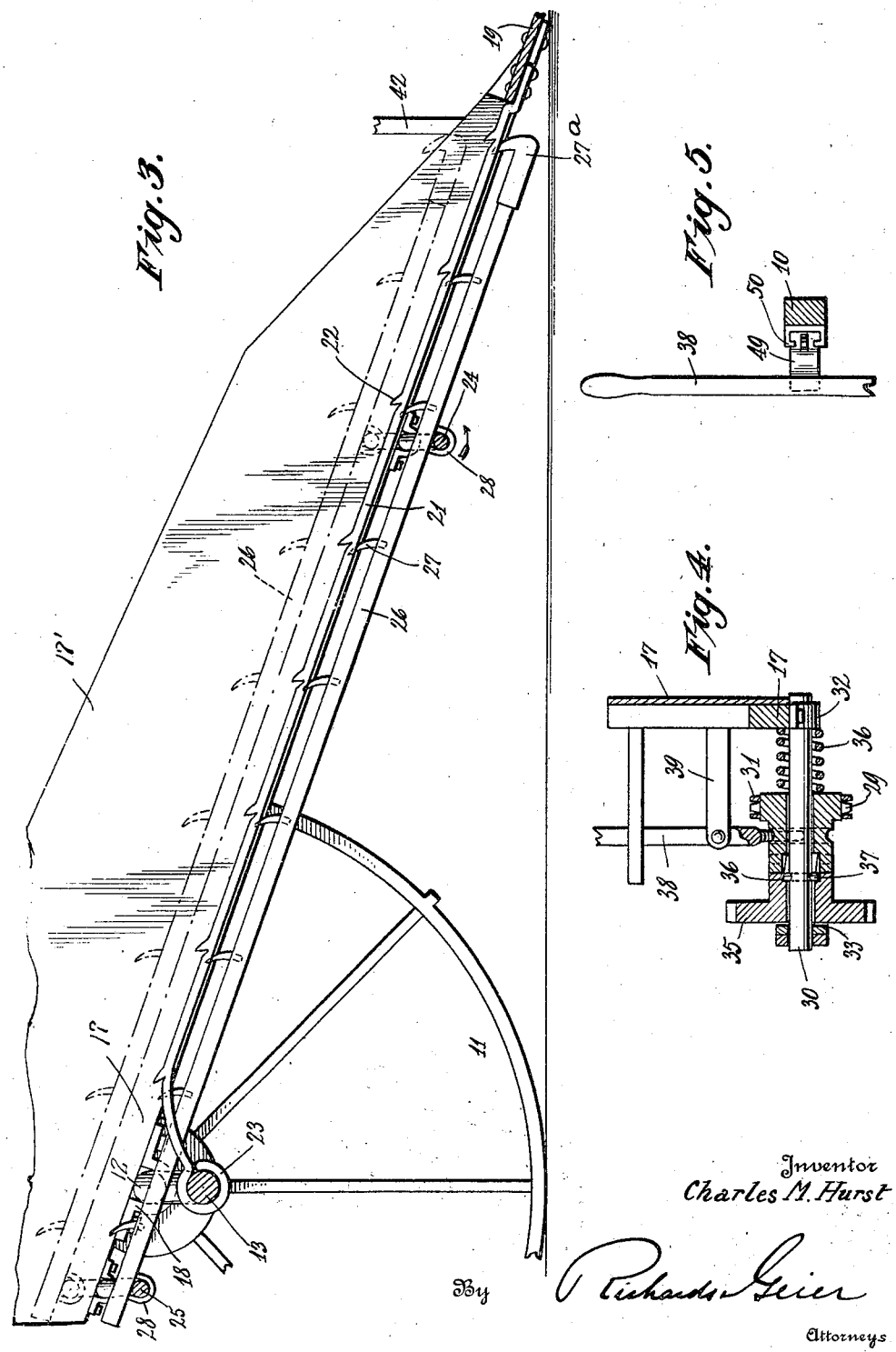

1,479,385

UNITED STATES PATENT OFFICE.

CHARLES M. HURST, OF ROBERSONVILLE, NORTH CAROLINA.

PEANUT HARVESTER.

Application filed November 3, 1921. Serial No. 512,494.

*To all whom it may concern:*

Be it known that I, CHARLES M. HURST, a citizen of the United States, and resident of Robersonville, in the county of Martin and State of North Carolina, have invented certain new and useful Improvements in Peanut Harvesters, of which the following is a specification.

In the harvesting of peanuts and also of potatoes, large masses of earth usually adhere to the roots of the plants and to the nuts, thus making it necessary to remove this adhering earth before the crop can be handled and gathered in a satisfactory or expeditious manner. This soil is usually dislodged by shaking the plants either by hand labor or by machinery which scoops the plants up out of the soil and then subjects them to a shaking action. Such machinery as has been devised for this purpose is usually cumbersome and intricate and requires at least four horses or mules to pull it, and the operating parts thereof are so located that they soon become clogged with dirt and débris, which not only renders these machines harder to pull but also causes frequent breakages with the consequent loss of time and money for frequent repairs. It is therefore the principal object of this invention to provide a machine that will dig and shake the plants at the one operation, thus obviating the necessity of hand labor for the shaking and to improve upon existing machines by providing an efficient machine of great simplicity having a relatively small number of moving parts, thereby requiring less power to operate it and further to locate the driving means out of the path of the dirt and débris whereby both the initial cost and the possibility of breakage and upkeep will be reduced to a minimum, and the machine may be readily operated by a pair of horses or mules.

With these and other objects in view that will be in part obvious and will appear more in detail to those skilled in the art, from the following disclosure, in which a preferred embodiment of the invention is set forth, reference being had to the drawing in which—

Figure 1 is a side elevation of the machine.

Figure 2 is a plan view,

Figure 3 a central longitudinal section on an enlarged scale, part of the machine being broken away.

Figure 4 is an enlarged cross sectional detail on the line 4—4 of Figure 1, and

Figure 5 is a cross sectional detail on the line 5—5 of Figure 1.

As shown in the drawings, the frame 10 of the machine which may be of any suitable construction is provided with a pair of rear supporting wheels 11 which may be provided with the usual tread members and which are carried by an axle 12 having an offset central portion 13 for a purpose which will hereafter appear.

The front portion of the frame 10 is supported preferably by a caster wheel 14 which is mounted upon a swivelled vertical shaft 15, the upper end of which may be received in a socket 16 provided in the lower side of the frame.

Pivoted upon the axle 12 as by the brackets 18 are a pair of downwardly inclined side bars 17 to which are secured upwardly extending side casings 17' of sheet metal or other suitable material. To the lower ends of the side bars 17 is secured a shovel or scraper 19 as by the castings 20 which preferably extend inwardly beyond the inner ends of the side bars to deflect the plants away from the side casings and on the shaking mechanism. A plurality of transversely spaced stationary bars 21 provided with upwardly projecting teeth 22 are secured at their lower ends to the scraper 19 and at their upper ends to any suitable fixed point and as shown in the drawings, they are provided with an eye 23 which is looped around the offset portion 13 of the axle 12. Rotatably carried by suitable bearings in the side bars 17 are a pair of cranks 24, 25 which carry a plurality of spaced reciprocating bars 26 provided with upwardly extending teeth 27. The bars 21 and 26 are preferably arranged alternately across the machine as shown in Figure 2 and a suitable space is left between the proximate bars to allow the dirt which is shaken from the plants to fall between the bars to the ground. The lower end of each of the bars 26 is provided with a hook like member 27ª, which engages the plants and draws them upwardly off the scraper 19.

Any suitable means for driving the crank 24 may be provided and as shown, one of the wheels 11 is provided with a sprocket 28 around which and a smaller sprocket 29, keyed or splined on a jack shaft 30, is trained a chain 31. The inner end of the jack shaft 30 is journalled in a suitable bearing 32 carried by a side bar 17 while the outer end is jornalled in a bracket 33 also secured to the said side bar. The sprocket 29 is keyed to rotate with the shaft 30 but is slidable longitudinally thereon and is provided with inclined clutch teeth adapted to cooperate with similar clutch teeth provided on the inner face of a spur gear 35 rotatable on the shaft 30, said spur gear meshing with a gear 41 secured to the crank 24. A spring 36, see Figure 4, normally urges the clutch teeth into cooperative engagement and the gear 35 is provided with a recess 36 against the perimeter of which the outer ends of a pin 37 carried by the shaft 30 frictionally engage. The sprocket 29 is provided with the usual groove to receive the lower forked end of a clutch shifting lever 38 pivoted upon a bracket 39 carried by the side casing and the upper end of which terminates in a handle conveniently arranged with respect to the driver's seat 40. It will be noted by referring to Figure 2 that the inclinations of the clutch teeth is such that the teeth will slip and force sprocket 29 against the tension of the spring 36 to disengage the clutch teeth if the machine be backed.

Suitable means for raising, lowering and adjusting the height of the scraper are provided and preferably consist of a pair of links 42, one on each side of the machine, pivoted at their lower ends to their respective side bars 17 and at their upper ends to a pair of bell cranks 43 secured to a shaft 44 which is journalled in the frame 10 and which carries an operating lever 45 provided with a pawl 46 adapted to engage the teeth of the segment 47 to hold the scraper at any desired position of adjustment. Means are also preferably provided whereby the raising of the scraper will simultaneously shift the clutch into inoperative position and may consist of a connecting rod 48 pivoted to one of the bell crank levers 43 and to a wedge shaped member 49 arranged to slide in guides 50 carried on the frame 10 adjacent to the handle 38 and adapted when drawn forwardly by the rod to press against the clutch lever and disengage the clutch teeth.

The chain 31 is preferably provided with a tightener such as indicated by the numeral 51.

The operation of the machine is as follows: the machine is driven over the row to be harvested with the wheels straddling the row, the operator then lowers the shovel or scraper 19 to the desired depth, securing it in adjusted position by means of the segment 47 and pawl 46. The rotation of the wheels 11 turns the crank 24 through the sprockets 28, 29 and chain 31. The crank 24 in turning carries with it the bars 26 which as will obviously appear will move from the full line position shown in Figure 3 to the dotted line position moving upwardly beyond the stationary bars 21 and at the same time moving rearwardly. The plants and earth scooped up by the shovel are pushed upwardly by the forward motion of the machine, the hooks 27ª engaging the plants and pulling them upwardly with a quick jerking movement, which is obtained by the rapid rotation of the crank 24 due to the large gear reduction, and depositing the plants on the stationary bars 21 where they are engaged by the lowermost serration or tooth 22 and held in position to be engaged by the lowermost tooth 27 in the next rotation of the crank 24, which in turn moves the plants upwardly, this operation being repeated until the plants are carried up to the back end of the inclined box from which they fall onto the ground. The rapid rotation of the crank 24 and bars 26 subjects the plants to a vigorous shaking which effectually disengages all the adhering dirt leaving the plants in a clean condition to be readily gathered into heaps preparatory to removing the nuts therefrom. The spaces between the bars 21 and 26 allow the loosened dirt to fall through to the ground. If the scraper dig too deeply into the ground, the machine is backed slightly, the inclination of the clutch teeth allowing the clutch to slip with out operating the shaking mechanism and if the shaking mechanism become fouled or choked, the operator can readily disengage the clutch by means of the handle 38. The scraper may be lifted clear of the ground and held in this position whenever desirable by means of the handle 45, the relative positions of the wedge 49 and associated parts being such that the handle 38 will be operated to disengage the clutch when the scraper is raised to the inoperative position.

It will be obvious that many changes and variations may be made in the invention as disclosed and therefore it is my intention to cover such changes and modifications as fall within the scope of the appended claims.

Having thus described my invention what I wish to claim as new and desire to secure by Letters Patent, is:—

1. In a machine of the character described, a wheeled support, an inclined frame pivoted to said support a scraper fixed to the lower extremity of said frame, a plurality of stationary bars provided with upwardly extending teeth, secured to said frame, a plurality of toothed reciprocating bars and means to reciprocate said last named bars.

2. In a machine of the character described, a wheeled support, a scraper, and a shaking mechanism carried by said support, said shaking mechanism comprising a plurality of movable toothed bars and a plurality of stationary toothed bars.

Signed at Robersonville in the county of Martin and State of North Carolina.

CHAS. M. HURST.